United States Patent [19]

Wycech

[11] Patent Number: 4,737,407

[45] Date of Patent: Apr. 12, 1988

[54] THERMOSET PLASTIC PELLETS AND METHOD AND APPARATUS FOR MAKING SUCH PELLETS

[75] Inventor: Joseph Wycech, Grosse Pointe Woods, Mich.

[73] Assignee: Essex Composite Systems, Fraser, Mich.

[21] Appl. No.: 837,624

[22] Filed: Mar. 10, 1986

[51] Int. Cl.⁴ .................... C08J 9/32; B29B 9/06; B29C 65/30; B29C 67/02

[52] U.S. Cl. .................... 428/323; 264/25; 264/26; 264/143; 264/DIG. 6; 428/313.3; 428/313.5; 428/313.9; 428/407; 521/54; 521/55; 523/218; 523/219

[58] Field of Search .................... 264/DIG. 6, 143, 25, 264/26; 428/313.5, 313.9, 313.3, 323, 407; 523/218, 219; 521/54, 55

[56] References Cited

U.S. PATENT DOCUMENTS

| | | | |
|---|---|---|---|
| 2,021,837 | 11/1935 | Davidson | 264/142 |
| 2,531,739 | 11/1950 | Orsini | 264/141 |
| 2,622,273 | 12/1952 | Detwiler | 264/141 |
| 2,770,841 | 11/1956 | Cooke et al. | 264/209.4 |
| 2,870,486 | 1/1959 | Wagner et al. | 264/209.6 |
| 2,951,261 | 9/1960 | Sherman | 425/425 |
| 2,975,483 | 3/1961 | Cooper et al. | 264/143 |
| 3,046,606 | 7/1962 | Carter | 264/141 |
| 3,092,878 | 6/1963 | Conger | 264/120 |
| 3,230,184 | 1/1966 | Alford | 523/219 |
| 3,253,967 | 5/1966 | Blakey, Jr. et al. | 264/DIG. 6 |
| 3,304,355 | 2/1967 | Pobst, Jr. et al. | 264/117 |
| 3,324,510 | 6/1967 | Kleeb | 425/310 |
| 3,509,247 | 4/1970 | Perrone et al. | 264/143 X |
| 3,519,706 | 7/1970 | Pantsios | 264/143 |
| 3,562,373 | 2/1971 | Logrippo | 264/118 |
| 3,600,486 | 4/1971 | Walker et al. | 264/89 |
| 3,652,486 | 3/1972 | Young | 523/219 |
| 3,670,467 | 6/1972 | Walker | 51/298 |
| 3,676,534 | 7/1972 | Anderson | 264/9 |
| 3,892,708 | 7/1975 | Cronenberger et al. | 523/219 |
| 3,900,543 | 8/1975 | Davis | 264/DIG. 6 |
| 3,917,547 | 11/1975 | Massey | 428/313.9 X |
| 4,038,238 | 7/1977 | Cravens | 523/219 X |
| 4,104,098 | 8/1978 | Hush et al. | 156/149 |
| 4,122,145 | 10/1978 | Hartmann | 264/174 |
| 4,126,661 | 11/1978 | Fulconis et al. | 264/209 |
| 4,170,619 | 10/1979 | Fridrich | 264/113 |
| 4,240,779 | 12/1980 | Turk | 425/313 |
| 4,247,502 | 1/1981 | Loechell | 264/143 X |
| 4,248,584 | 2/1981 | Fridrich | 425/553 |
| 4,273,806 | 6/1981 | Stechler | 264/DIG. 6 |
| 4,363,690 | 12/1982 | Gagliani et al. | 264/DIG. 6 |
| 4,405,543 | 9/1983 | Murphy et al. | 264/DIG. 6 |
| 4,433,068 | 2/1984 | Long et al. | 264/DIG. 6 |
| 4,447,565 | 5/1984 | Lula et al. | 264/DIG. 6 |
| 4,459,254 | 7/1984 | Zuber | 264/143 |
| 4,581,191 | 4/1986 | Hartmann | 264/143 |

Primary Examiner—Philip Anderson
Attorney, Agent, or Firm—Cullen, Sloman, Cantor, Grauer, Scott & Rutherford

[57] ABSTRACT

The method of the present invention includes mixing a low viscosity thermoset resin and microspheres together without melting the thermoset resin and extruding the mixture to form a continuous strand of paste-like uncured material. The continuous strand is gelled on a conveyor which preferably includes a radiant heater or other means for accelerating the gelling of the continuous strands into solid form. The strands are then cut or chopped into pellet form and may be coated with an adhesive or B-staged material in preparation for forming into structural reinforcements. The pellets are filled with microspheres in the amount of 20 to 35% of resin weight. The pellets may include unexpanded thermally expandable microspheres which permit expansion of the pellets when exposed to heat to provide a pellet having a bulk density as low as 9 pounds per cubic foot. The pellets may be formed of a thermoset resin such as a polyester resin or epoxy resin, vinylester resin, polyurethane resin, or phenolic resin and may include organic, inorganic or glass pre-expanded microspheres. Alternatively, the pellets may include unexpanded thermally expandable thermoplastic microspheres or a liquid blowing agent if expansion of the pellets is desired. A cure aid or curing agent may be included in the pellet mix to facilitate curing of the pellet in the final reinforcement and other additives may be incorporated in the pellet mix to improve extrudability or other properties of the pellets.

18 Claims, 3 Drawing Sheets

THERMOSET PLASTIC PELLETS AND METHOD AND APPARATUS FOR MAKING SUCH PELLETS

BACKGROUND OF THE INVENTION

I. Technical Field

The present invention relates to a method and apparatus for making uncured thermoset pellets and the pellets made thereby. More particularly, the invention relates to microsphere-filled thermoset resin pellets which are extruded in paste form, gelled and pelletized according to a unique method with a specialized production apparatus.

II. Background Art

Plastic materials are currently used for filling and reinforcing structural members. Expanded polyurethane foam is known to be used for filling structural members to improve sound dampening, thermal insulating and crush strength qualities of the structures. Plastic fillings are used in boats to fill flotation cavities and in vehicles to act as sound baffles and reinforcements for hollow structural members.

The most common type of plastic used in such applications is expanded polyurethane foam. In structural reinforcement applications, expanded polyurethane foam lacks compressive and tensile strength and has extremely low heat resistance.

In recent years, specialized plastic reinforcements have been developed wherein macropheres are formed of glass microspheres which are combined with a phenolic binder. The macrospheres are then coated with a phenolic resin which increases the strength and shell thickness of the macrospheres but also adds weight to the final product. After coating with a phenolic resin, the macrospheres are coated with a B-staged phenolic or epoxy which permits the macrospheres to be bound together to form a structural reinforcement. Examples of two types of such macrospheres are two materials manufactured by 3M Company and identified by the following trade designations: M27X for uncoated macrospheres and M35EX for phenolic-coated macrospheres. The above macrospheres are known to be used as structural reinforcements for vehicles.

Another approach to improving the performance of plastic fillers to function as reinforcements is to provide styrofoam beads which are coated with an epoxy. One such product is sold by W. D. Grace Company under the tradename Ecosphere. The styrofoam bead has an epoxy coating which is in the form of a cured shell. The styrofoam bead with cured shell may be coated with an adhesive and used as a constituent element for structural fillers. However, the coated styrofoam beads are expensive and have only slighter greater compressive strength than polyurethane fillers and have only limited heat resistance due to the fact that the styrofoam substrate may begin to melt at temperatures as low as 210° F.

In terms of processing techniques, it is known to extrude thermoset materials by first B-staging the thermoset materials by heating them prior to extrusion. The B-staged thermoset materials emulate thermoplastic materials and are extrudable to a limited extent. However, the high viscosity of B-staged thermoset materials prevents incorporation of a high percentage of microsphere fillers since the heat and friction developed during the mechanical mixing of the B-staged resin causes the microspheres to be crushed and would limit the weight savings sought to be realized by the incorporation of lightweight microsphere fillers.

Prior art plastic reinforcements fail to provide a lightweight yet strong reinforcement which is thermally stable and competitive in cost to other types of structural reinforcements. These and other problems and disadvantages are overcome by the present invention as summarized below.

SUMMARY OF THE INVENTION

Figure 7:
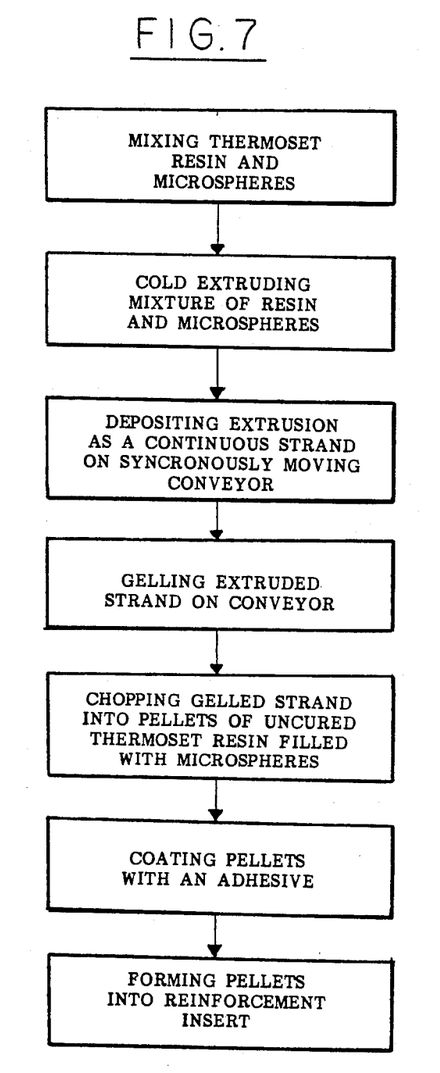
FIG. 7 is a block diagram illustrating the steps of the method of the present invention.

Referring now to FIG. 7, the method of making filled thermoset plastic pellets of the present invention is illustrated in a block diagram. The first step is shown to comprise mixing thermoset resin and microspheres. The mixture is cold extruded, preferably through a plurality of extrusion ports, to form at least one continuous strand which is deposited on an endless belt conveyor. The conveyor preferably moves at a speed substantially equal to the rate that the strand is extruded. The strand is a paste form mixture when extruded which is gelled on the conveyor to form a solid strand without B-staging the material. The strand is then chopped or otherwise formed into pellets. The pellets may be formed into structural reinforcements and cured in place in the structural members as described in applicant's copending application Ser. No. 811,041, filed Dec. 19, 1985, the disclosure of which is hereby incorporated by reference.

The pellets are preferably coated with an adhesive prior to forming the pellets into structural reinforcements. The thermoset resin in the pellets is preferably a low viscosity epoxy or polyester resin and the microspheres may include expanded or unexpanded microspheres of organic materials or glass. Maximum strength and weight savings can be achieved by combining the resin with microspheres in the range of ratios of 1:2.75 to 3.5 parts by volume.

The mixing steps are performed at ambient temperatures or more preferably at a slightly elevated temperature below the B-staged temperature of the mixture. The mixture is preferably not B-staged in the mixer but is instead heated on the conveyor to a point above B-stage for a time period insufficient to B-stage wherein the strands gel within a very short period of time as they are conveyed to the pelletizer.

The pellets made according to the present invention are intended to be used in forming structural reinforcement members. The pellets comprise uncured thermoset plastic resin which is intermixed with expanded microspheres and converted to its gelled, uncured, solid form. The pellets also preferably include thermally expandable microspheres which permit further reduction of the bulk density of the pellets. Alternatively, the pellet mixture may include a blowing agent which permits expansion of the pellets upon heating.

The pellets are preferably formed of a low viscosity thermoset resin such as a polyester resin or thermally cured epoxy resin. The pellets formed according to the process of the present invention are unique in that they are made by an extrusion process which provides significant processing efficiencies and yet are uncured solid members permitting the reinforcements formed with the pellets to be cured during later processing steps. Since the pellets are formed of thermoset resins, they are significantly stronger in terms of tensile and compressive strength as compared to thermoplastic pellets.

The pellets are generally composed of the following constituents in the following approximate ranges:

TABLE 1

| Constituent | Range |
| --- | --- |
| Thermoset Resin | 100% resin weight |
| Organic or Inorganic Pre-Expanded Microspheres | 15-35% resin weight |
| Unexpanded Microspheres | 0-10% resin weight |
| Curing Agent | 0-8% resin weight |
| Wetting Agent | 0-15% resin weight |

The cure agent amount stated above would be appropriate for polyester or vinylester systems. If a one-part epoxy resin is used, the cure agent could be in the range of 0 to 10% resin weight, and if a two-part epoxy resin is used, the cure agent could be in the range of 0 to 50% resin weight. As is well known in the industry, the quantity of curing agent depends upon resin and cure system.

The apparatus for making the thermoset pellets of the present invention includes a batch mixer and extruder, or kneader-extruder, wherein the thermoset plastic resin, microspheres and other constituents are combined and from which the mixture is extruded. The mixture is extruded on an endless belt conveyor in paste form as a continuous strand. The endless belt conveyor is substantially synchronously operated with the rate of extrusion since the strand has only limited compressive and tensile strength at the time it is extruded. If the endless belt conveyor were to run too quickly, the strand would be stretched or broken and if ran too slowly, the strand would accumulate on the conveyor. It is preferred to provide an extrusion die having a plurality of linear bores which are oriented at an acute angle, preferably less than 30 degrees, relative to the top surface of the conveyor belt. The strength of the strand is increased as the mixture gels. Gelling can be accelerated by exposing the strand to a catalyzing environment, preferably under an infrared heater, as it passes along the conveyor. The strands are heated to above their B-stage temperature on the conveyor for a time period less than that required to B-stage the mixture. After gelling, the strands are tack-free, hardened, ductile but substantially uncured. The strands are then conveyed to an unloading station wherein the strands are broken or cut into pellets.

The pellets are coated with an adhesive by a tumbling process. The adhesive is comprised of a thermoset resin having two percent or less tensile elongation. The resin coating is provided primarily to provide adhesion between pellets and to the structure being reinforced. If the coating has low tensile elongation characteristics, the ultimate compression strength of the pellets and reinforcements made with the pellets will be enhanced. Also, the resin coating can improve moisture resistance of the pellets and reinforcements made thereby and assures good long-term strength.

The primary advantage of the method and apparatus used in the present invention is that a simple and continuous process may be used to form highly filled, high strength thermoset pellets which are then usable as a constituent in the manufacture of precast reinforcement inserts or as loose structural fillers. In addition, the product made according to the process of the present invention is superior to thermoplastic pellets in terms of strength and temperature resistance. The pellets made according to the process of the present invention are also superior to prior art B-staged thermoset pellets because they can be highly filled with unexpanded and expanded microspheres.

The primary advantage of the pellets is their high strength, ultra-low weight and low cost. The thermoset pellets have superior tensile strength and compressive strength as compared to thermoplastic pellets. Also, the thermoset materials have a higher temperature resistance as compared to prior art thermoplastic pellets. Bulk density of the pellets formed according to the present invention may be as low as 12 pounds per cubic foot when no unexpanded microspheres are used and may be as low as approximately 9 pounds per cubic foot if thermally expanded microspheres are included in the pellet mixture. The pellets are solid, that is, they do not contain voids or openings for the purpose of reducing bulk density.

As is well known, thermoset materials generally have greater compressive and tensile strength than thermoplastic materials. When combining this strength advantage with the above density levels, it will be readily appreciated that an extremely high strength and lightweight material is provided. Such a high strength, low density material is ideal for use as a structural filler where weight savings are important. For example, in automobiles, airplanes and boats, lightweight pellets are important for energy savings since the weight of a vehicle may be reduced by the elimination of heavier structural reinforcements. The high strength of the reinforcements made with the pellets of the present invention permits the use of plastic reinforcements in applications where polyurethane foam and thermoplastic reinforcements lack the required strength.

Another advantage of the method of the present invention is that the pellets can conceivably be made from any type of thermoset material. With the increasing use of plastic structural parts which require reinforcement, the need for plastic reinforcement of such structures is increasing. For example, with resin transfer molded parts, vehicle body parts are formed that require reinforcement. According to the present invention, reinforcements can be matched to the type of plastic used in the plastic structural member. The reinforcements are therefore superior to metal reinforcements in that they are more compatible for painting, have greater moisture resistance and permit matching for thermal expansion.

Other objects, advantages and efficiencies of the present invention will become apparent upon reviewing the attached drawings in view of the following specification and appended claims.

DETAILED DESCRIPTION OF THE ILLUSTRATED EMBODIMENTS

Figures 1, 1A:
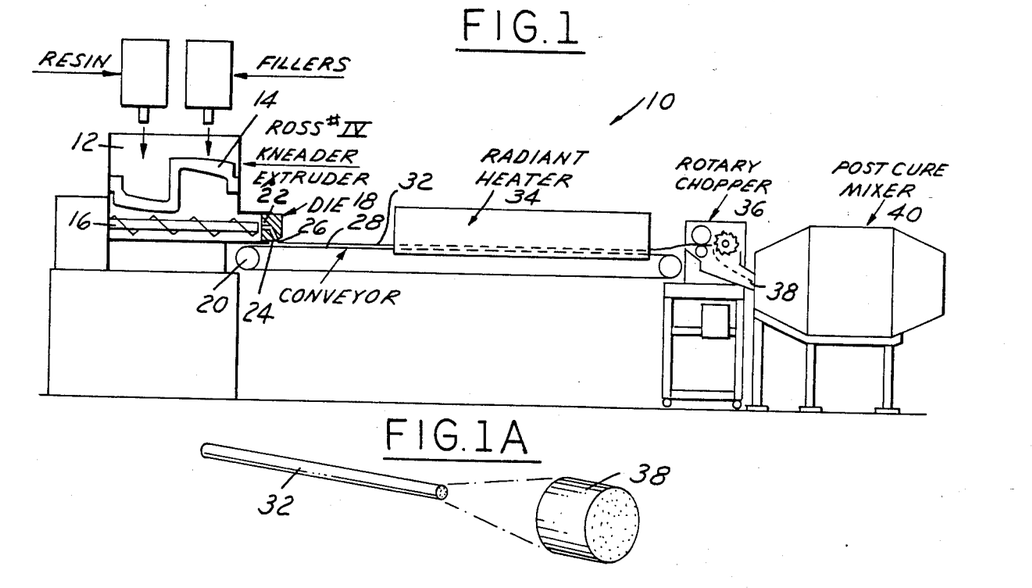
FIG. 1 is a side elevational schematic view of an illustrated embodiment of the apparatus of the present invention.
FIG. 1a is a perspective view of the continuous strand and magnified perspective view of a pellet made in the apparatus of FIG. 1.

Referring now to FIG. 1, the apparatus 10 used in manufacturing the pellets of the present invention is schematically shown. The process of the present invention is schematically shown in FIG. 7 and begins by combining thermoset resin, fillers and other constituents in a kneader-extruder 12. The kneader-extruder 12 preferably includes a S-shaped mixing element 14 which combines the pellet constituents at room temperature without heating the mixture, provided that the resin viscosity is less than about 700 centipoises (cps). The kneader-extruder 12 includes a screw extrusion element 16 located in the lower portion of the kneader-extruder 12 which forces the mixture through an extrusion die 18 and onto the endless belt conveyor 20.

Figure 2:
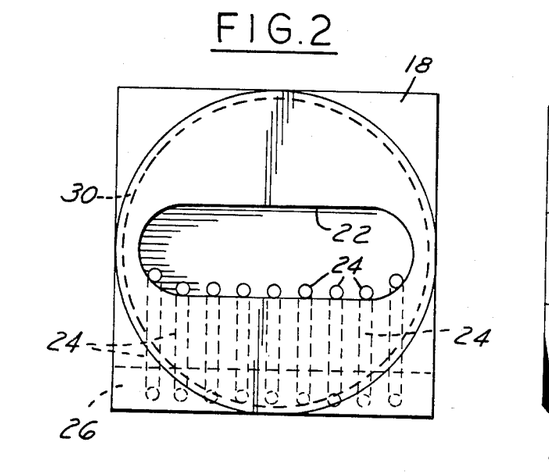
FIG. 2 is a end elevational view of a kneader-extruder die of the present invention.
Figure 3:
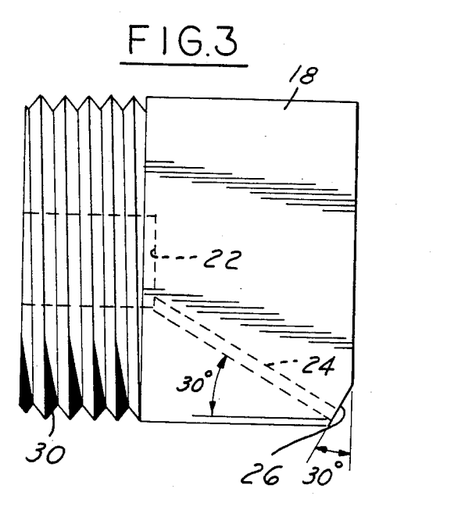
FIG. 3 is a side elevational view of a kneader-extruder die of the present invention.

Referring now to FIGS. 2 and 3, the extrusion die 18 is shown to include a central cavity 22 in which the resin/filler mixture is forced. A plurality of linear extrusion ports 24 extend from the central cavity 22 to an extrusion face 26 at an angle of 30 degrees or less relative to the top surface of the conveyor belt. The angle is an acute angle of incidence relative to the top surface of the conveyor belt 28 generally in the same direction as the conveyor belt 28 moves. The die 18 includes an externally threaded portion 30 on one end for attaching the die 18 to the kneader-extruder 12, as is well known in the art. The extrusion face 26 is oriented at a 30 degree or smaller angle relative to the front end of the die 18 which is perpendicular to the top surface of conveyor belt 28. The precise angulation of the extrusion die ports 24 is preferred to be maintained at 30 degrees or less to facilitate extruding the mixture on the conveyor belt 28 without breakage, stretching or compacting. The conveyor belt 28 is preferably made of or coated with a polytetrafluoroethylene or silicon coating to prevent adhesion of the mixture to the belt.

The mixture is deposited on the conveyor 28 in paste form, as shown in FIGS. 1 and 1a. The continuous strand 32 is highly filled with microspheres to provide cohesiveness in the strand after the strand is deposited on the conveyor. The high degree of filler loading prevents distortion when the strand is heated during the gelling step. The extruded paste is different from thermoplastic extrusions which are extruded in their melted state. In contrast to thermoplastic extrusions, the continuous strands made according to the present invention are not melted. A limited amount of heat may be developed during the kneading and extruding processes as a result of friction generated by the mixing.

With certain viscous resins having favorable heat distortion characteristics, it is necessary to warm the resin mixture to permit sufficient filler loading to form a cohesive extruded paste. Resins having good heat distortion characteristics generally have viscosity in excess of 700 cps. Extremely high viscosity resins having excellent heat resistance may be mixed with other compatible resins to reduce viscosity and aid in mixing with fillers. The viscosity of such resins prevents adding enough filler at ambient temperature to form an extruded strand which will retain its extruded cross-section after being deposited on the conveyor. Heating the resin mixture to between 125° to 140° F. lowers the viscosity of the resin to less than 700 cps and permits filler loading to between 20 and 35 percent of resin weight which gives the extruded strand sufficient cohesiveness after extrusion to be moved without distortion by the conveyor through the gelling step. Heating other types of resin above ambient but below B-stage may also permit increased filler loading. The extruded strand maintains its shape after being deposited in paste form on the conveyor belt because it is extensively loaded with lightweight fillers.

With resins having lower viscosity, additional heat is generally not necessary. Alternatively, the kneader-extruder 12 may include means for vibrating the die to reduce viscosity due to the thixotropic nature of the mixture and to aid in extrusion.

Figures 4, 5, 6:
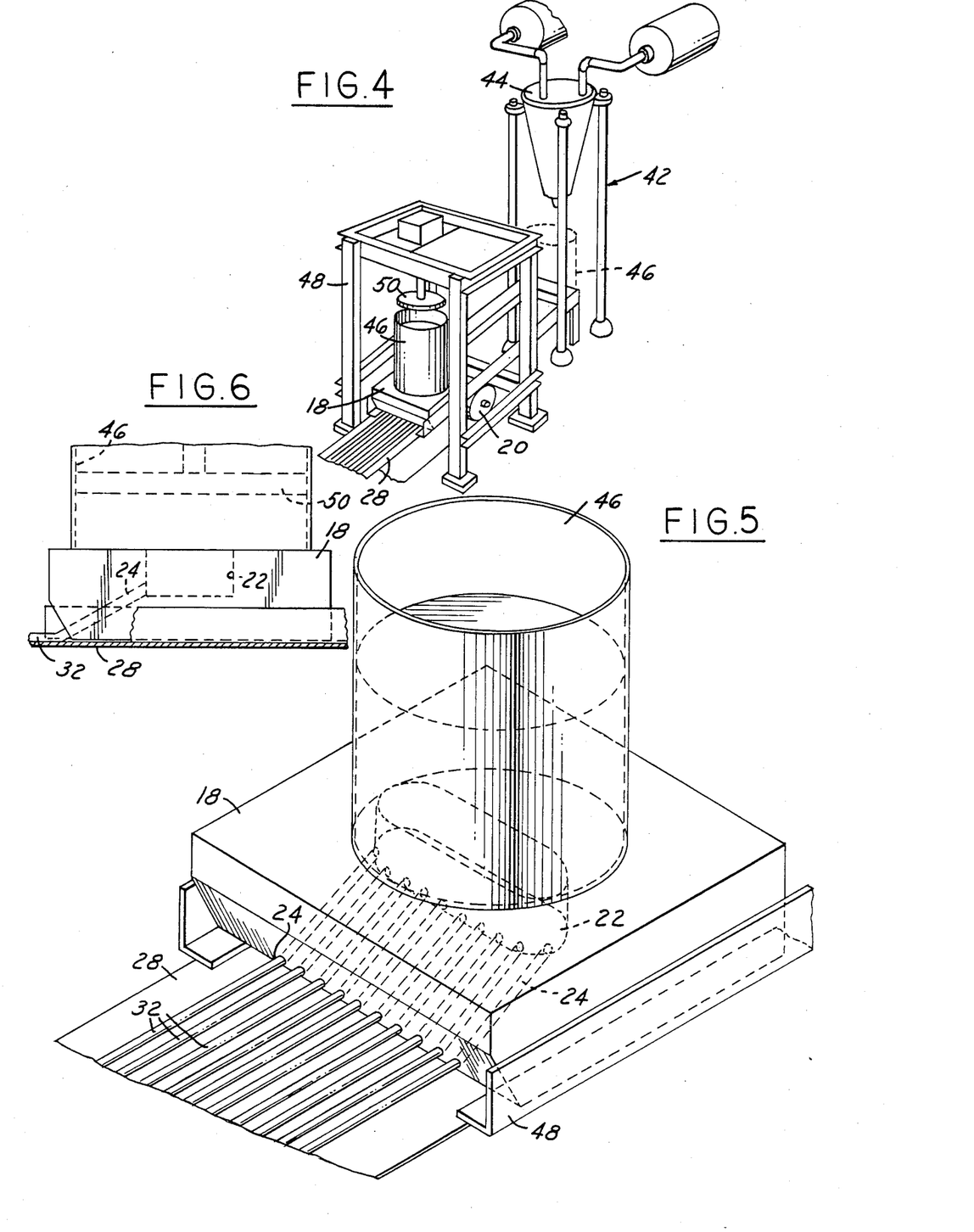
FIG. 4 is a perspective view of an illustrated embodiment of a bulk mixer and hydraulic press extruder of the present invention.
FIG. 5 is a perspective view of the drum and extrusion die used in the hydraulic press-type extruder and die as shown in FIG. 4.
FIG. 6 is a fragmentary side elevational view of the hydraulic press extruder and die as shown in FIG. 4.

Referring now to FIGS. 4 through 6, an alternate mixer and extruder apparatus will be described. Instead of a kneader-extruder 12, a batch mixer 42 comprising a feeder 44, loads the resin, fillers and other constituents into a mixing drum 46. The mixture in the mixing drum 46 may be manually or power mixed to form a homogeneous mixture. The drum 46 is then placed in a press 48 having a compression element 50 for exerting a compressive force on the mixture in the drum 46 to cause the mixture to be extruded through the extrusion die 18 located at the base of the central cavity 22 and a plurality of extrusion ports through which the mixture is forced onto the top surface of the conveyor belt 28 of the conveyor 20. The construction of the extrusion die 18 is substantially the same as the extrusion die of the kneader-extruder except that the central cavity is below the compression element 50 instead of being laterally adjacent the screw extrusion element 16. The orientation of the extrusion ports 24 relative to the conveyor is substantially the same for both apparatus.

The conveyor 28 preferably includes radiant heaters 34, or a catalyzing environment chamber, disposed adjacent the conveyor surface for accelerating the gelling process of the strands 32. It is possible to perform the process by allowing the strands to gel at room temperature without any expedient for gelling. However, for processing efficiency it is generally preferred to accelerate the gelling process by subjecting it to a catalyzing environment chamber 34 wherein the continuous strands are gelled and detackified. The catalyzing environment chamber is preferably a radiant heater 34 but may alternatively contain an ultraviolet radiation source, a microwave radiation source, radio waves or a chemical vapor. By using a catalyzing environment chamber, the time required to gel the strands may be reduced to as little as ten seconds or as long as three minutes but would preferably be a 60 to 90 second time period.

If the present mixture includes a blowing agent, or thermally expandable microspheres, the microspheres, or blowing agent, may be activated by the catalyzing environment chamber, or radiant heaters 34, causing the strands to expand during the gelling process. The primary reason for including unexpanded microspheres, or a blowing agent, is to reduce the density of the pellets. If expandable microspheres are included in the mixture, the quantity of expanded microspheres may be reduced accordingly.

The final step in the process is performed in a rotary chopping pelletizer 36 which chops the strands into generally cylindrical pellets 38. The pellets 38 are preferably one-eighth inch long cylinders which are one-eighth inch in diameter. The size of the pellets is expected to vary from one-sixteenth to one-quarter of an inch in diameter and the pellets 38 are typically cut into cylindrical segments having the same length as they are in diameter. The strand must have more than 10% tensile elongation to be processed by a pelletizer. After pelletizing, the curing process continues until the pellets have about 6 to 8% tensile elongation.

After pelletizing, the pellets 38 are loaded into a post-cure mixer 40 and tumbled as they are coated with a B-staged epoxy resin or an epoxy resin dispersion in a solution. The epoxy resin is a heat curable resin preferably mixed with a cure agent. The coating may also be a polyester or vinylester. One epoxy resin that has produced good results is a Celanese resin having the trade designation CMD 35201. A coating made with CMD 35201 and a curing agent had approximately 2% maximum tensile elongation. Pellets coated with the CMD viscosity of the mixture and difficulty in extrusion which could be alleviated by adding a lubricating additive or heating.

The bulk density of pellets made with only pre-expanded microspheres may be as low as 12 pounds per cubic foot. If additional weight reduction is desired, the pellets may include thermally expandable microspheres in addition to the pre-expanded microspheres wherein the bulk density of the pellets may be reduced to as low as 9 pounds per cubic foot.

Other additives such as cure agents, wetting agents or diluents may be added to the mixture to accelerate the curing of the resin or lubricate the resin keeping it flowable for processing by the kneader-extruder.

The following table sets forth the constituents, trade names, generic composition and preferred and broad ranges of constituents.

TABLE II

| Generic Constituent | Type | Tradenames* | Broad Range as % Resin Wgt. | Preferred Range % Resin Wgt. |
|---|---|---|---|---|
| Thermoset Resin | a. Polyester | Altek Polyester Molding Resin USS Chem./LB804-31 USS Chem./MR13031 | 100% | 100% |
| | b. Vinylester | USS Chem./MR 14059 | | |
| | c. Epoxy | Celanese/Epi-Rez SU 2.5/507 Celanese/CMD35201 Shell/EPON 828/1031 Celanese/Epi-rez 504 | 100% | 100% |
| Microsphere Filler | a. Organic | Phila. Quartz/Q-Cell 200 PA Industries/Extendospheres | 25–35% | 25–35% |
| | b. Glass Bubbles | 3M Company/C 15 | 20–30% | 20–25% |
| | | Grefco/Dicaperl HP (10–30μ) | 25–35% | 25–35% |
| | c. Thermoplastic | Pierce & Stevens/Miralite 177 | 0–5% | 3–5% |
| Curing Agent | a. Organic Peroxide | Tert Butyl Peroxide Diethylacetate Noury/Percadox 16 | 1–3% | 2–3% |
| | b. Dicyandiamide | Celanese/DiCy | 3–10% | 8–10% |
| | c. Aliphatic Amine | Epicure/826 | 25% | 25% |
| | | Shell/Epon 871 | 25% | 25% |
| | | Epicure/855 | 50% | 50% |
| | d. Anahydride | Buffalo Color Corp./ NADIC Methyl Anahydride | 80–90% | 80–85% |
| Expansion Agent | a. Expandable Microspheres | Pierce & Stevens/Microlite 126/206 | a. 3–10% | a. 6–8% |
| | b. Blowing Agent | Uniroyal/Celogen TSH | b. 0.25–3% | b. 2–3% |
| Accelerators | Tertiary Amines | Benzyldimethylamine (2, 4, 6 tri dimethylaminoethyl phenol) (dimethylaminomethyl phenol) 2 ethyl-4 methyl imidazole (EMI-24) | 0–8% | 4–6% |
| Wetting Agent or Diluent | a. Surfactant | Butyl Glycidyl Ether Cresyl Glycidyl Either Neopentyl Glycol | a. 0–25% | 6–15% |
| | b. Polymer | Styrene | b. 0–15% | 5–13% |
| | c. Solvent | Water Ether Ester | c. 0–15% | 5–10% |
| Plasticizers | Polymer | C. P. Hall/Paraplex G-30 | 0–15% | 5–10% |

If desired, pellets may be made according to the invention from only thermoset resin, microsphere filler and curing agent.
*The tradenames are listed by company name/trade designation as appropriate.

35201 mixture had good moisture resistance which protects the long-term strength characteristics of the pellets.

Instead of coating the pellets 38, immediately after pelletizing they may be stored for later processing.

After the pellets 38 have been coated, they may be stored or transferred to a precast reinforcement forming operation as described in my copending patent application, Ser. No. 811,041, filed Dec. 19, 1985.

The pellets 38 in their simplest form are comprised of thermoset resin, resin cure agent, and pre-expanded microspheres with the microspheres being in the range of 20–35% resin weight. Currently, experimentation with thermoset polyester resins and inorganic pre-expanded microspheres has resulted in the production of pellets wherein the microspheres may be added in the amount of three and one-half times the resin volume. Further addition of microspheres results in excessive Examples of resin mixtures are given below:

EXAMPLE I

Celanese Epi-Rez 504 (Bisphenol A)

| % Resin Weight | |
|---|---|
| 50% | Cel Epicure 855 |
| 23% | 3M C-15 |

2 min strand gel at 165° F.

EXAMPLE II

Alkyl Polyester Molding Resin

| % Resin Weight | |
|---|---|
| 22% | 3M C15 bubbles |
| 1% | Noury Percadox 16 (bis peroxydicarbonate) |

60 sec strand gel at 200° F.

EXAMPLE III

U.S.S. Chemical LB 804-31 (Polyester)

| % Resin Weight | |
|---|---|
| 25% | 3M-C15 |
| 0.25% | MEK Peroxide |

60 sec strand gel at 165° F.

EXAMPLE IV

Altek Polyester Molding Resin

| % Resin Weight | |
|---|---|
| 5% | Miralite 177 |
| 1% | Noury Percadox 16 (bis peroxydicarbonate) |

60 sec strand gel at 190° F.

EXAMPLE V

U.S.S. Chemical LB 804-31 (Polyester)

| % Resin Weight | |
|---|---|
| 24% | 3M C15 bubbles |
| 5% | Microlite 206 |
| 2% | Tert Butyl Peroxy (Noury) |

60 sec strand expansion and then gel at 250° F.

EXAMPLE VI

Celanese epoxy Epi-Rez 5071 (Bisphenol A)

| % Resin Weight | |
|---|---|
| 25% | Celanese Epi-Cure 826 |
| 30% | Q-Cell 200 |

90 sec strand gel at 190° F.

EXAMPLE VII

U.S.S. Chemical LB804-31 (Polyester)

| % Resin Weight | |
|---|---|
| 15% | Dicaperl HP (10–30 microns) |
| 3% | Miralite 177 |
| 2% | Noury Percadox 16 |

90 sec strand gel at 175° F.

EXAMPLE VIII

U.S.S. Chemical MR 13031 (Polyester)

| % Resin Weight | |
|---|---|
| 25% | 3M C15 |
| 2% | Celogen TSH |

| % Resin Weight | |
|---|---|
| 2% | Tert Butyl Peroxy (Noury) |

60 sec strand expansion and then gel at 250° F.

EXAMPLE IX

Shell Epon 828 (Bisphenol A)

| % Resin Weight | |
|---|---|
| 100% | Shell Epon 1031 |
| 20% | Shell Epon 871 |
| 110% | 3M C15 |
| 80% | Nadic Methyl Anhydride |
| 4% | 2 ethyl-4 methyl-imidazole |

90 sec strand gel time at 195° F.

EXAMPLE X

Celanese SU-2.5 (polyfunctional)

| % Resin Weight | |
|---|---|
| 25% | Celanese Epi-Rez 507 |
| 70% | Dicaperl HP (10–30 microns |
| 100% | Nadic Methyl Anhydride |
| 6% | 2 ethyl-4 methyl-imadazole |

90 sec strand gel time at 195° F.

EXAMPLE XI

U.S.S. Chemical 14059 (Vinylester)

| % Resin Weight | |
|---|---|
| 25% | 3M C15 |
| 2% | Celogen TSH |
| 2% | Tert Butyl Peroxy (Noury) |

If the process includes coating the pellets with an epoxy resin in the post-cure mixer, an aqueous epoxy resin dispersion can be used which includes from 0.25 to 1 percent resin weight of an accelerator such as Pyridine (DMP 30) or 2-ethyl 4-methyl imidiazole (EMI 24) and from 2 to 4 percent by resin weight of a catalyst, preferably dicyandiamide.

TESTING

The ultimate strength and average crush load of blocks of pellets made according to the formulas of Examples I through III above have been tested against reinforcement blocks made of the prior art macrobubbles sold by 3M under the trade designation M35EX. As noted above, one of the most important characteristics of a reinforcement is its strength, which may be measured in terms of ultimate strength and average crush load.

Blocks of pellets made in accordance with Examples I through III above and microbubbles were formed into separate cylindrical blocks having a diameter of three inches and a height of three inches. The blocks were formed of pellets coated with a two-part ambient-cured epoxy material and cast in a cylindrical mold. Each of the blocks was placed in a compression test machine having a machine speed of 0.5 inches per minute. The compression test machine has a maximum compression of 20,000 pounds with the result being recorded in pounds compression over time on a chart recorder. The test results recorded included recording of crush load to 17-20% of the total height of the block.

The prior art control sample exhibited ultimate crush strength of 4,000 pounds and an average crush load of approximately 3,000 pounds.

Two different batches of pellets made in accordance with Example I were tested and both yielded considerably higher average crush load. The ultimate strength of the two batches differed with one batch having an ultimate strength of 6,400 pounds and a second batch having an ultimate strength of 4,200 pounds. The batch having the greater ultimate strength also had considerably better average crush load. The reason for the disparity between the two batches is that the batch having the lower ultimate strength and average crush load was made with resin that was more than one year old at the time it was formed into pellets.

Pellets made in accordance with Example II were formed into blocks and tested, yielding an ultimate strength measurement of 6,700 pounds. The average crush load of the block was slightly lower than the average crush load for the prior art block and the load over time decreased until it stabilized at approximately 2,000 pounds.

The block made with pellets made according to Example III had an ultimate strength measurement of 4,000 pounds and a lower average crush load than the control. The crush load characteristic was similar to that followed by the block made with pellets of Example II.

In summary, the test results obtained with pellets made in accordance with Example I was markedly superior to those realized by the prior art in terms of both ultimate strength and average crush load. The ultimate strength was more than 50% greater than the control for pellets made in accordance with Examples I and II. The average crush load for pellets made according to Example I in both batches was substantially superior to that of the test block made with the prior art 3M macrosphere material. The ability to control the ultimate strength and average crush load characteristics of reinforcements made with the pellets of the present invention presents the possibility of engineering reinforcements to meet strength, weight and cost constraints depending upon the requirements of the particular reinforcement.

Generally, the most important performance criteria for a plastic reinforcement element is that it have the required ultimate strength and average crush load bearing capability. Another very important characteristic of a plastic reinforcement is the mass of the reinforcement, especially in view of the current effort to reduce weight in vehicles.

The ultimate strength of a reinforcement is vital to its impact resistance. In addition to ultimate strength, the average crush load is indicative of the load required to crush the reinforcement to a degree of time dependent deflection. The average crush load is important in analyzing the ability of the reinforcement to withstand sheer and bending loads. For desirable ultimate strength, it has been found that a low percent tensile elongation, such as 2%, provides relatively high ultimate strength characteristics. Conversely, higher percent tensile elongation characteristics, such as 6 to 7% tensile elongation, generally provide superior average crush load characteristics.

Distortion of reinforcements when subjected to heat can be a problem in some applications. In such applications, it may be desirable to establish and specify a minimum heat distortion temperature. Heat distortion in vehicle reinforcements is particularly important in engine compartment reinforcements where temperatures may exceed 200° F. Thermoplastic reinfocements which are competitive in cost are not sufficiently heat-resistant and urethane foams suitable for such environments are extremely expensive and not process feasible. According to the present invention, resins, constituents and relative mixtures may be varied to satisfy minimum heat distortion requirements.

Desirable strength characteristics of plastic reinforcements may be diminished over time, especially if exposed to moisture. Generally, the greater the percent tensile elongation of a given resin, the less resistant it is to moisture.

One final desirable characteristic of a plastic reinforcement is its cost relative to other plastic reinforcements or metal reinforcements that offer comparable strength.

One problem with heat-resistant thermoset resins is that they tend to be too viscous to mix with microspheres at ambient temperature. It has been found that the viscosity of a resin prior to adding the filler materials should be less than 700 centipoises. Therefore, to permit the use of viscous heat-resistant resins, it is necessary to warm the resin to a temperature above ambient temperature but below the B-stage temperature of the resin. As the resin is heated, its viscosity is reduced, and the microsphere fillers may be intermixed therewith.

In a preferred embodiment of the present invention, a pellet having a percent tensile elongation of 6 to 8% would be provided to improve average crush load characteristics of the pellet. The pellet would then be coated with a low percent tensile elongation epoxy resin, having approximately 2% tensile elongation, to improve the ultimate strength of the reinforcement and provide good moisture resistance, thereby assuring retention of desirable strength characteristics. If the reinforcement is intended to be used in a high temperature environment, the resin selected for both the pellet and coating should be of a heat-resistant type. In this way, a tough, lightweight, high strength, heat and moisture-resistant reinforcement, having significant cost advantages, would be provided.

COATING EXAMPLE

| % Resin Weight | |
|---|---|
| 100% | Celanese CMD 35201 |
| 3.5% | DiCyanamid |
| 1% | 2 ethyl-4 methyl-imadazole |

If an expandable resin coating is desired to provide an expansion of the adhesive resin coating in the final cure step, the resin coating may include from 2 to 3 percent by resin weight of a blowing agent such as Celogen TSH, a trademark of Uniroyal, or it may include from 6 to 10 percent by resin weight of unexpanded thermoplastic microspheres such as Microlite 126/206, a trademark of Pierce and Stevens Company. The coating may be applied to the pellets at the rate of approximately 20 to 35 percent of the total pellet weight.

A coupling agent may be used in the resin or on the microbubbles to enhance the properties of the reinforcement incorporating the pellets by increasing the tensile elongation and compressive strength. The coupling agent may be either a silane or a non-silane coupling agent.

It will be appreciated that the above examples and description of the preferred apparatus, process and compositions are intended as exemplary and not in a limiting step. It will be appreciated that within the broad scope of the appended claims many variations, modifications and changes may be made within the spirit and scope of the present invention.

I claim:

1. A solid pellet consisting essentially of substantially uncured thermoset polymeric resin and microspheres which have been intermixed and extruded said pellet having a coating of a B-staged resin.

2. A method of making filled thermoset plastic pellets comprising:
   mixing thermoset resin and micropheres to form a homgeneous mixture;
   extruding said mixture to form at least one continuous strand;
   depositing said strand on an endless belt conveyor moving at a speed substantially equal to the rate said strand is extruded;
   gelling said moving strand on said moving conveyor by exposing said strand to heating means positioned adjacent said moving conveyor to form a solid strand having a percent tensile elongation of more than 10% which is less than B-staged; and
   forming said strand into further curable pellets of thermoset resin filled with microspheres by chopping said gelled strand with chopping means to form said further curable pellets.

3. The method of claim 1, and wherein said thermoset resin has a viscosity of less than 700 centipoises at ambient temperatures and said mixing step is performed at ambient temperature.

4. The method of claim 2, and wherein said thermoset resin is an epoxy resin, said microspheres include expanded and unexpanded microspheres and said microspheres are present in an amount from about 20% to 35% of the weight of said resin.

5. The method of claim 2, and wherein said step of gelling is performed in a period of from 10 seconds to 180 seconds.

6. The method recited in claim 2, further including the step of loading said pellets into post-cure tumbling means, mixing said pellets during post-curing with a B-staged thermoset resin in said tumbling means, and tumbling said pellets during post-curing and said B-staged thermoset resin in said tumbling means to coat said pellets with said B-staged thermoset resin and to post-cure said pellets.

7. The method of making filled thermoset plastic pellets recited in claim 2, wherein said heating means includes at least one radiant heater positioned adjacent said conveyor such that said strand is heated to accelerate the rate at which said strand gels.

8. A method of making filled thermoset plastic pellets comprising:
   mixing thermoset resin and microspheres to form a homogeneous mixture;
   extruding said mixture to form at least one continuous strand;
   depositing said strand on an endless belt conveyor moving at a speed substantially equal to the rate said strand is extruded;
   curing said moving strand on said moving conveyor by subjecting said strand to ultraviolet radiation to form a solid strand having a percent tensile elongation of more than 10% which is less than B-staged; and
   forming said strand into further curable pellets of thermoset resin filled with microspheres by chopping said gelled strand with chopping means to form said further curable pellets.

9. A method of making filled thermoset plastic pellets comprising:
   mixing thermoset resin and microspheres to form to homgeneous mixture;
   extruding said mixture to form at least one continuous strand;
   depositing said strand on an endless belt conveyor moving at a speed substantially equal to the rate said strand is extruded;
   curing said moving strand on said moving conveyor by subjecting said strand to microwave radiation to form a solid strand having a percent tensile elongation of more than 10% which is less than B-staged; and
   forming said strand into further curable pellets of thermoset resin filled with microspheres by chopping said gelled strand with chopping means to form said further curable pellets.

10. A method of making filled thermoset plastic pellets comprising:
    mixing thermoset resin and microspheres to form to homogeneous mixture;
    extruding said mixture to form at least one continuous strand;
    depositing said strand on an endless belt conveyor moving at a speed substantially equal to the rate said strand is extruded;
    curing said moving strand on said moving conveyor by subjecting said strand to radio wave radiation to form a solid strand having a percent tensile elongation of more than 10% which is less than B-staged; and
    forming said strand into further curable pellets of thermoset resin filled with microspheres by chopping said gelled strand with chopping means to form said further curable pellets.

11. A process of reinforcing structural members comprising the steps of forming a plurality of solid pellets of thermoset plastic resin intermixed with microspheres wherein said microspheres are provided in the range of 20 to 35% of resin weight, and a curing agent compatible with the thermoset resin in the amount of 1 to 50% of resin weight, said resin being gelled in solid form, packing said pellets into a cavity, and casting said pellets to form a reinforcement.

12. The process of claim 11, wherein said microspheres include from 15 to 35% by resin weight of expanded microspheres and from 0 to 10% by resin weight of thermally expandable microspheres.

13. The process of claim 11, and including from 0.25 to 3% by resin weight of an expansion agent.

14. The process of claim 11, wherein said resin is selected from the group comprising: polyester resin, vinylester resin, phenolic resin and epoxy resin.

15. An apparatus for making uncured microsphere-filled thermoset pellets comprising:
    a container defining an interior opening for receiving liquid thermoset plastic resin and microspheres;

means operatively connected to said container for mixing said resin and said microspheres at a low speed to form a homogeneous mixture;

means operatively connected to said container for compressing said mixture;

an extrusion die in fluid communication with said container, said die having a plurality of openings for forming continuous stands of said mixture;

a conveyor having an endless belt disposed below said die;

said plurality of openings comprising linear bores extending at an oblique angle relative to a top surface of said belt;

said belt being rotated below said die wherein said top surface passes said plurality of openings at substantially the same rate of speed as said mixture issues from said die whereby belt receives said mixture thereon without substantially pulling or compressing said mixture;

a radiation source being disposed adjacent said conveyor and directing radiation at the mixture on the endless belt to gel the strands of the mixture at an accelerated rate into a solid form within from about 10 seconds to 180 seconds from the time at which said strands are extruded onto said belt;

means contiguous with said conveyor for unloading said strands and dividing said strands into pellets of uncured thermoset plastic pellets filled with microspheres.

16. The apparatus of claim 8 wherein said means for mixing and said means for compressing said mixture is a kneader-extruder.

17. The apparatus of claim 15 wherein said radiation source is an infrared heat lamp.

18. The apparatus of claim 15 wherein said unloading and dividing means comprises a rotary chopper disposed at the end of the endless belt conveyor opposite the extrusion die.

* * * * *